May 20, 1952  E. A. TEEPELL  2,597,546
TAMPER-PROOF VALVE CAP
Filed June 17, 1947
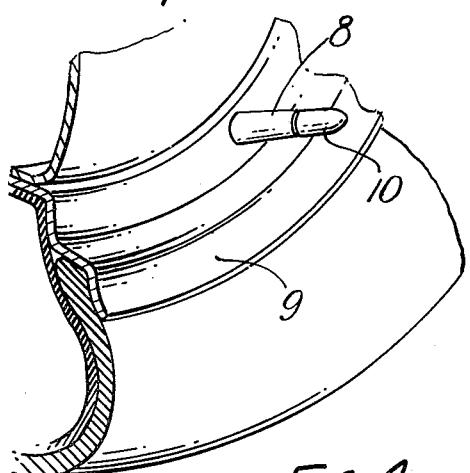
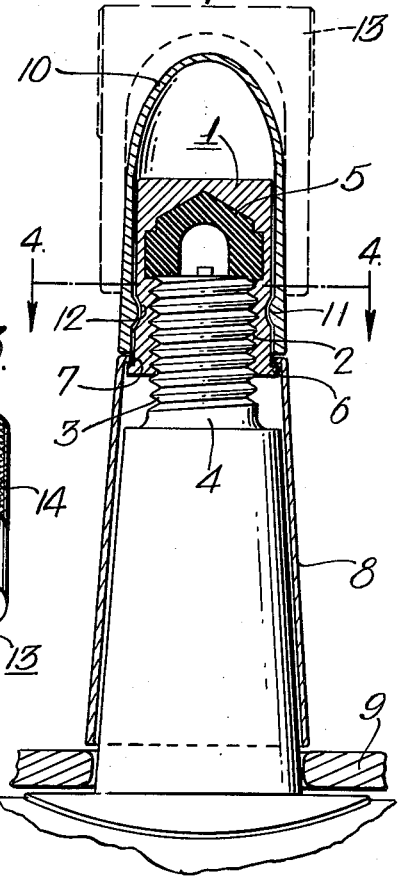
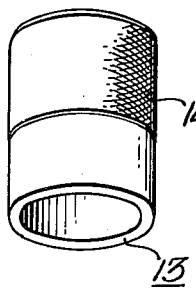
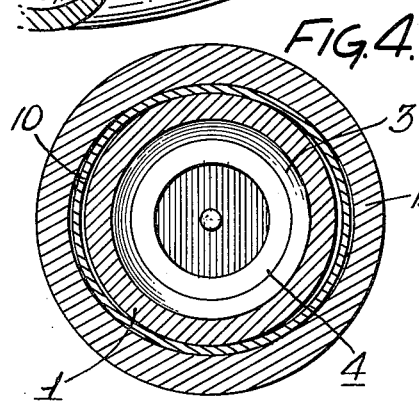
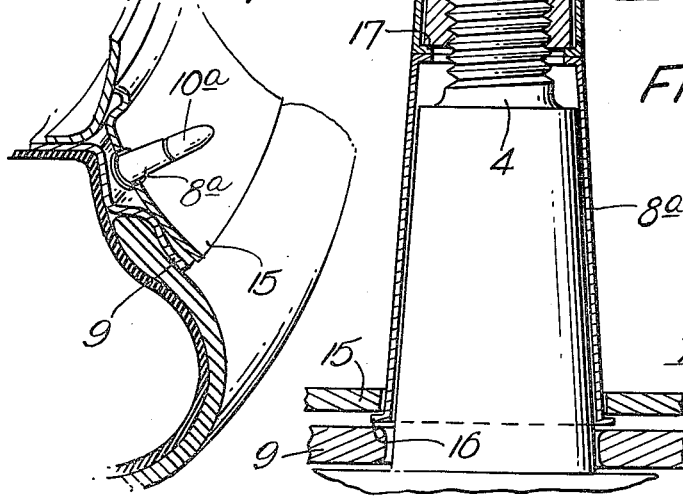
Inventor:
Edward A. Teepell
by his Attorneys
Howson &
Howson Patented May 20, 1952

2,597,546

UNITED STATES PATENT OFFICE 2,597,546

TAMPERPROOF VALVE CAP

Edward A. Teepell, Philadelphia, Pa.

Application June 17, 1947, Serial No. 755,047

5 Claims. (Cl. 138—89.3)

This invention relates to new and useful improvements in tire valve caps, and more particularly to tire valve caps which are constructed to prevent theft of the caps from the valve stems of tires.

For many years the caps upon the valve stems of tires of automobiles, bicycles and the like have constituted an attractive nuisance to juvenile pranksters and others who derive great satisfaction from appropriating such caps to their own use and, in some cases, causing the air to escape from the tires after removing the caps. This latter is a particular nuisance and can cause a motorist considerable delay and loss of time as well as unnecessary expense.

With the foregoing in mind, the principal object of the present invention is to provide a valve cap which embodies novel features of construction and arrangement normally operable to prevent theft of the cap from a valve stem by an unauthorized person.

Another object of the invention is to provide a novel valve cap as set forth which is attractive in appearance and is constructed in a manner and design to harmonize with present day vehicle styles.

A further object of the present invention is to provide a novel valve cap device having the features and advantages set forth which is of relatively simplified construction, comparatively inexpensive to manufacture, and entirely effective and foolproof in operation and use.

These and other objects of the invention and the various features and details of the construction and operation of the device are hereinafter fully set forth and described with reference to the accompanying drawings, in which:

Fig. 1 is a sectional view through a valve cap made according to the present invention showing the same in position upon the valve stem of a tire.

Fig. 2 is a fragmentary perspective view partially in section showing the valve cap upon the stem of a tire mounted on the wheel of an automobile.

Fig. 3 is a view in perspective of a clamp member which is adapted to be used in securing the cap upon a valve stem and in removing the cap therefrom.

Fig. 4 is an enlarged sectional view taken on line 4—4, Fig. 1, showing the manner in which the clamp operates to effect securement and removal of the valve cap.

Fig. 5 is a sectional view through a modified form of device embodying the present invention; and Fig. 6 is a fragmentary perspective view partially in section showing the valve cap of Fig. 5 in association with the stem of a tire mounted upon a wheel equipped with the metallic white side wall rims currently in vogue.

Referring now to the drawing, and more particularly to Fig. 1 thereof, a typical embodiment of a valve cap made according to the present invention comprises an inner cap 1 which is internally threaded as indicated at 2 for threading engagement with the threaded neck portion 3 of the usual valve stem 4. The cap 1 is provided with the usual seal 5 to prevent leakage of air from the stem when the inner cap 1 is secured thereon in the relation shown.

As shown in the drawing, the inner cap 1 is provided at its lower end with a radially projecting flange or shoulder portion 6 upon which seats the internal flange portion 7 that is formed at the upper end of a tubular skirt member 8. This tubular skirt member 8 is slightly tapered as shown and is constructed and arranged to extend substantially the entire distance to the rim 9 of the wheel and thereby conceal the valve stem 4. It is to be noted that the skirt member 8 is not fixed or secured to the inner cap 1 and hence is free to rotate relative thereto and to the valve stem 4.

An outer cap member 10, of inverted generally U-shape in cross-section, overlies the inner cap 1 and extends downwardly entirely to the upper end of the skirt 8. The outer cap 10 is secured upon the inner cap 1 by means of an annular bear or projecting portion 11 which is engaged in a circumferential groove or recess 12 that is formed in the exterior of the inner cap 1 a short distance above the flange or shoulder 7 thereof. This construction serves to secure the outer cap 10 against axial or longitudinal displacement from the inner cap 1, and also permits the outer cap 10 to rotate substantially freely with respect to said inner cap 1. The bead 11 may be formed by leaving an external bead of metal exteriorly of the outer cap 10 and then upsetting or otherwise forcing it into the recess 12 after the said outer cap has been placed in position upon the inner cap 1.

While there is sufficient clearance between the inner and outer caps 1 and 10 to permit of substantially free rotation therebetween, the fit of the outer cap upon the inner cap is relatively snug and the clearance therebetween is sufficiently close, for example, of the order of 0.002 inch, so that the outer cap 10 can be caused to engage or bind against the inner cap 1 by radially distorting said outer cap out-of-round only a relatively small amount. In this connection it is pointed out that the outer cap member 10 is constructed of material such as metal having a limited amount of inherent flexibility, and the wall of the cap is relatively thin so that it can be distorted out-of-round temporarily upon the application of substantial pressure exerted radially thereagainst.

Radial distortion of the outer cap 10 to cause it to bind against the inner cap 1 and thereby prevent relative rotation between said caps so that the inner cap may be unscrewed from the valve stem neck 3 by rotation of the outer cap 10, may be accomplished by means of a clamp element which is adapted to be forced manually onto the said outer cap 10. As shown in Fig. 3, such a clamp may comprise a cup-shaped member 13 having a cross-sectional configuration which may be just slightly out-of-round or substantially an elipse whose short axis is of a length just slightly less than the normal diameter of the outer cap 10 and whose long axis is just slightly greater than the normal diameter of said cap 10. To facilitate handling, the clamp member 13 may be knurled externally as indicated at 14.

In operation, when the clamp member 13 is forced manually onto the outer cap 10, the latter is distorted out-of-round, for example, as illustrated in Fig. 4 of the drawing, thus causing said outer cap to bind against the inner cap 1 with sufficient grip to prevent relative rotation between the caps so that the inner cap 1 can be screwed upon, or unscrewed from, the stem neck 3 by rotationally actuating the outer cap 10 through rotation of the clamp member 13 thereon. When secured in position upon the valve stem 4 with the clamp 13 removed, the outer cap 10 and the skirt 8 are both rotatable relative to the inner cap 1 so that said inner cap 1 cannot be removed from the stem neck 3 merely by rotating either the outer cap 10 or the skirt 8 without the aid of the clamp member 13 or an equivalent device. On the other hand, by using the clamp 13 as described, the inner cap 1 may be unscrewed readily and easily from the neck 3 and removed entirely from the stem 4 along with the outer cap 10 and skirt 8.

A modified form of the invention is shown in Figs. 5 and 6 of the drawing which is especially suitable for use in conjunction with the decorative white side wall rims 15 that are used extensively at the present time. In this form of the invention the skirt 8a is adapted to remain upon the valve stem when the cap is removed and, to this end, the lower end of the skirt 8a is provided with an out-turned circumferential flange or lip 16 which is arranged to underlie the edge portion of the white side rim 15 that surrounds the opening through which the tire stem projects.

Also, in this embodiment of the invention, the previously described flange or shoulder portion 6 and recess 12 of the inner cap 1 are not present in the inner cap member 1a shown in Fig. 5 which is provided with a smooth exterior surface. In addition, the outer cap 10a of Fig. 5 is not provided with an internal annular bead or the like 11 as in the case of the cap 10, and the wall of the cap 10a entirely overlies the wall of the inner cap 1a and has its lower or inner end edge flanged or turned under the edge of the lower face of the inner cap 1a, for example, as indicated at 17.

This construction serves to secure the inner and outer caps 1a and 10a against axial or longitudinal displacement with respect to each other while at the same time permitting the said caps to rotate substantially freely relative to one another. In all other respects the construction of the inner and outer caps 1a and 10a are the same, respectively, as the inner and outer caps 1 and 10, and the operation thereof in conjunction with the clamp 13 is identical to the operation described with respect to the embodiment of the invention shown in Fig. 1.

From the foregoing, it will be apparent that the present invention provides a novel valve stem cap construction which is operable normally to prevent theft of the cap from a valve stem by unauthorized persons. The invention also provides a novel cap device as set forth which is neat and attractive in appearance, and is constructed in a manner and design to harmonize with present day vehicle styles. Furthermore, the invention provides a novel cap device having the described features and advantages which is of relatively simplified construction, comparatively inexpensive to manufacture, and entirely effective and foolproof in use and operation.

While certain embodiments of the invention have been illustrated and described herein, it is not intended to limit the invention to such disclosures, and changes and modifications may be made therein and thereto within the scope of the following claims.

I claim:

1. In a valve stem cap device, an internally threaded inner cap member arranged for threaded engagement with a valve stem and having in the external wall thereof a circumferentially extending recess, a continuous circumferential flange projecting outwardly from the inner end of said inner cap member, an outer cap member rotatably mounted upon said inner cap member and having an internal bead projecting into the recess of said inner cap member operable to secure said outer cap member against axial displacement with respect to the inner cap member while permitting substantially free rotation of said cap members relative to each other, said outer cap member closely surrounding said inner cap member and being distortable radially to thereby grip the inner cap member and cause rotation of said outer cap to be imparted to said inner cap.

2. In a valve stem cap device, an internally threaded inner cap member arranged for threaded engagement with the neck portion of a valve stem, a continuous circumferential flange projecting outwardly from the inner end of said inner cap member, an outer cap member rotatably mounted on said inner cap member, intercooperating means on said cap members operable to secure said outer cap member against axial displacement with respect to the inner cap member while permitting substantially free rotation of said cap members relative to each other, said outer cap member closely surrounding said inner cap member and being distortable radially to thereby grip the inner cap member and cause rotation of said outer cap to be imparted to said inner cap, and a tapered skirt member surrounding the valve stem and having a portion loosely interposed between the flange of the inner cap member and the inner end of the said outer cap member, the cap members being rotatable independently of said skirt member.

3. In a valve stem cap device, an internally threaded inner cap member arranged for threaded engagement with the neck of a valve stem, a continuous circumferential flange projecting outwardly from the inner end of said inner cap member, an outer cap member rotatably mounted upon said inner cap member, intercooperating means on said cap members operable to secure said outer cap member against axial displacement with respect to the inner cap member while permitting substantially free rotation of said cap members relative to each other, said outer cap member closely surrounding said inner cap member and being distortable radially to thereby grip the inner cap member and cause rotation of said outer cap to be imparted to said inner cap, and a tapered skirt member surrounding the valve stem having an inturned flange loosely engaged over the outwardly projecting flange of said inner cap member and interposed between the latter and the inner end of the said outer cap member.

4. In a valve stem cap device, an internally threaded inner cap member arranged for threaded engagement with a valve stem and having in the external wall thereof a circumferentially extending recess, an outer cap member rotatably mounted upon said inner cap member and having means projecting into the recess of said inner cap member operable to secure said outer cap member against axial displacement with respect to the inner cap member while permitting substantially free rotation of said cap members relative to each other, said outer cap member closely surrounding said inner cap member and being distortable radially to thereby grip the inner cap member and cause rotation of said outer cap to be imparted to said inner cap.

5. In a valve stem cap device, an internally threaded inner cap member arranged for threaded engagement with the valve stem, an outer cap member rotatably mounted on said inner cap member, and means on one of said cap members engageable within a recess extending circumferentially in the adjacent wall of the other cap member to secure said outer cap member against axial displacement with respect to the inner cap member while permitting substantially free rotation of said cap members relative to each other, said outer cap member closely surrounding said inner cap member and being distortable radially to thereby grip the inner cap member and cause rotation of said outer cap member to be imparted to said inner cap member.

EDWARD A. TEEPELL.

REFERENCES CITED

The following references are of record in the file of this patent:

UNITED STATES PATENTS

| Number | Name | Date |
|---|---|---|
| 1,229,928 | Frazer | June 12, 1917 |
| 1,309,215 | Nielsen | July 8, 1919 |
| 1,702,532 | Boomer et al. | Feb. 19, 1929 |
| 1,767,884 | Heinrich | June 24, 1930 |

FOREIGN PATENTS

| Number | Country | Date |
|---|---|---|
| 12,943 | Great Britain | 1911 |